United States Patent [19]

Onda et al.

[11] Patent Number: 4,708,231

[45] Date of Patent: Nov. 24, 1987

[54] CENTRIFUGAL CLUTCH

[75] Inventors: Takanori Onda; Hirofumi Kambe, both of Saitama, Japan

[73] Assignee: Honda Giken Kogyo Kabushiki Kaisha, Tokyo, Japan

[21] Appl. No.: 843,701

[22] Filed: Mar. 25, 1986

[30] Foreign Application Priority Data

Apr. 2, 1985 [JP] Japan .................................. 60-69496

[51] Int. Cl.$^4$ ............................................ F16D 43/284
[52] U.S. Cl. .............................. 192/103 F; 192/105 F; 192/106 R
[58] Field of Search ............ 192/103 A, 103 F, 105 F, 192/106 R, 106 F

[56] References Cited

U.S. PATENT DOCUMENTS

| | | | |
|---|---|---|---|
| 2,077,292 | 4/1937 | Waseige | 192/103 F |
| 2,981,392 | 4/1961 | Peras | 192/106 F |
| 3,176,813 | 4/1965 | Lee et al. | 192/105 F |
| 3,470,988 | 10/1969 | Sieverkropp | 192/106 F |
| 3,741,360 | 6/1973 | Patton | 192/103 F |
| 4,095,684 | 6/1978 | Rowen | 192/103 F |
| 4,238,020 | 12/1980 | Nerstad et al. | 192/105 F |
| 4,509,627 | 4/1985 | Kawamoto | 192/103 F |
| 4,574,929 | 3/1986 | Hayashi et al. | 192/103 F |
| 4,586,594 | 5/1986 | Duminy | 192/105 F |

FOREIGN PATENT DOCUMENTS

| | | |
|---|---|---|
| 2436 | 6/1979 | European Pat. Off. . |
| 11908 | 6/1980 | European Pat. Off. . |
| 1744611 | 7/1968 | Japan . |
| 44-2363 | 1/1969 | Japan . |
| 8204107 | 11/1982 | PCT Int'l Appl. . |
| 1492914 | 11/1977 | United Kingdom . |
| 1495113 | 12/1977 | United Kingdom . |
| 1539333 | 1/1979 | United Kingdom . |
| 2134605 | 8/1984 | United Kingdom . |

Primary Examiner—William F. Pate, III
Assistant Examiner—Caroline D. Dennison
Attorney, Agent, or Firm—Lyon & Lyon

[57] ABSTRACT

A centrifugal clutch employing a clutch outer, a clutch inner and an arrangement of alternating clutch outer and clutch inner plates. The clutch is actuated by means of an annular piston residing within a cylinder which accumulates oil. Centrifugal forces are generated within the oil to create a pressure which forces the annular piston to compress the clutch plate arrangement. An outlet is provided controlled by a valve about the periphery of the cavity defined by the piston. A clutch actuation means controls the outlet valve to provide for disengagement of the clutch even under rapid rotation.

5 Claims, 3 Drawing Figures

CENTRIFUGAL CLUTCH

BACKGROUND OF THE INVENTION

The field of the present invention is centrifugal clutches.

Conventional centrifugal clutches have been known which employ a clutch outer connected to an input, a clutch inner connected to an output and clutch inner and outer plates alternately arranged between the clutch inner and clutch outer. Means have been provided for compressing the clutch plates together to form a coupling upon experiencing centrifugal forces through rotation of the clutch itself. Such centrifugal clutches have included a centrifugal roller positioned between a clutch outer and a pressure plate for compressing the clutch plates. A slant is provided on one or both of the members retaining the centrifugal roller such that with rotation of the clutch outer, the centrifugal roller may urge the clutch plates into compressed engagement. Such a device is illustrated in Japanese Patent Publication Kokoku No. 17446/68.

In such a conventional centrifugal clutch employing a centrifugal roller, upon fluctuation in input torque, noise may frequently be produced due to the vibration of the roller. In such devices, the number of parts and the complexity of assembly is increased through the employment of centrifugal rollers and the like.

During high speed rotation of a clutch employing centrifugal rollers, the disengagement of the clutch requires overcoming the centrifigual forces imposed upon the rollers. Thus, the resistance increases with increased rotational speed such that the resistance to clutch disengagement may be low at low speeds and high at high speeds.

SUMMARY OF THE INVENTION

The present invention is directed to a centrifugal clutch which employs the pressure developed by a fluid experiencing centrifugal force. An annular piston may be employed in a cylinder to one side of an arrangement of inner and outer clutch plates. The cavity formed between the piston and the cylinder may be provided with liquid which, under centrifugal forces, creates a clamping force on the plates. Such an arrangement avoids the disadvantages of centrifugal rollers or other solid weights.

In a further aspect of the present invention, an outlet port may be employed at the outside of the cavity formed between the piston and cylinder. Such an outlet may employ a valve to release the fluid contained within the cavity. The valve can operate with nonvarying resistance such that resistance to the clutch operation is uniform at all operating speeds.

Accordingly, it is an object of the present invention to provide an improved centrifugal clutch. Other and further objects and advantages will appear hereinafter.

DETAILED DESCRIPTION OF THE PREFERRED EMBODIMENT

Figure 1:
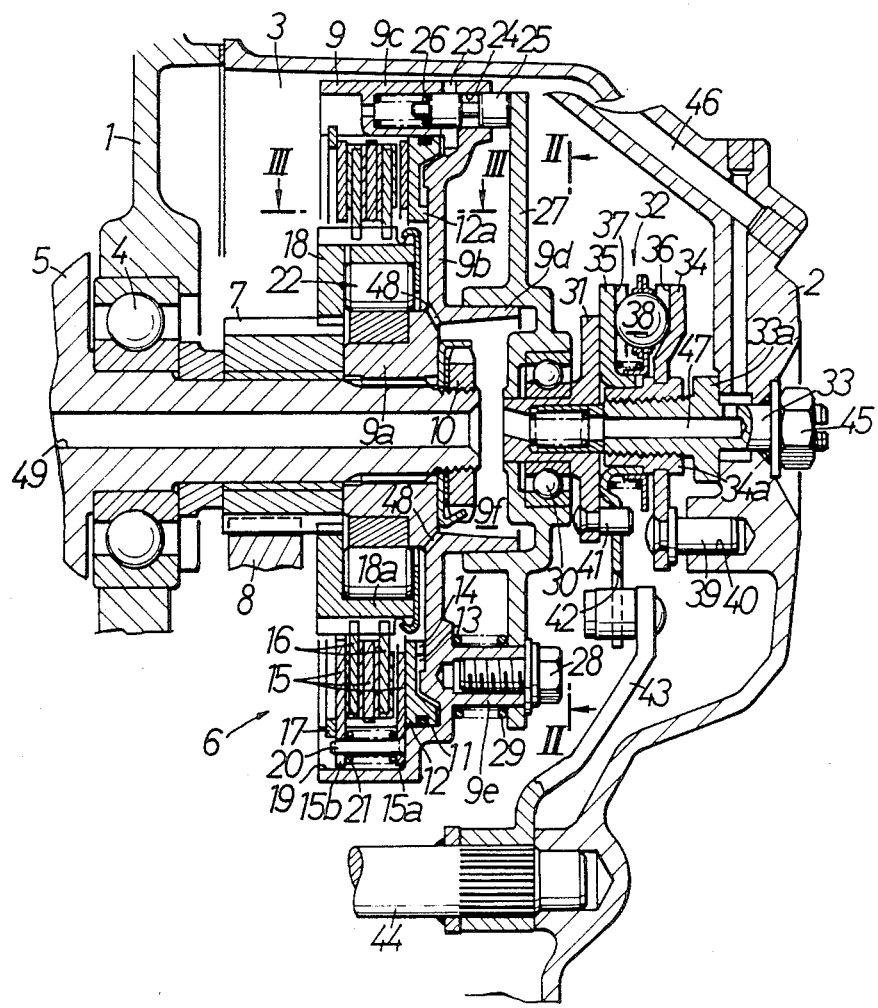
FIG. 1 is a cross-sectional view of a centrifugal clutch of the present invention taken along line I—I

Turning in detail to the drawings, the principle of operation of the preferred embodiment includes the provision of a cavity between a piston and cylinder. The piston is arranged to compress clutch plates between a clutch inner and clutch outer. The cavity receives oil supplied from a lubricant system at the inner periphery of the cavity. As the clutch is rotated, the oil contained within the cavity experiences centrifugal force which creates pressure against the piston for clamping the clutch plates. An outlet at one or more locations about the outer periphery of the cavity allows rapid release of the fluid contained within the cavity to reduce the pressure developed thereby. A valve mechanism is employed to control the outlet for disengagement of the clutch even at high speed.

To achieve the foregoing, a crankcase 1 of an engine is employed with a side cover 2 connected thereto. A clutch chamber 3 is thereby defined on one side of the crankcase 1 within the side cover 2. At the wall of the crankcase 1, bearings 4 support a crankshaft 5 which extends into the clutch chamber 3. The crankshaft 5 transmits power to a clutch 6 having an output gear 7 journaled about the crankshaft 5 and meshed with an output reduction gear 8.

The centrifugal clutch 6 includes a clutch outer 9 having a central boss 9a which is fitted to the end of the crankshaft 5 and coupled thereto by splines. A nut 10 retains the clutch outer 9 in position. The clutch outer 9 also includes a disc portion 9b extending radially outwardly from the outer end of the boss 9a. A cylindrical portion 9c of the clutch outer 9 extends axially from the outer periphery of the disc portion 9b toward the output gear 7. In addition, a cylindrical guide portion 9d of the clutch outer 9 projects from the outer surface of the disc portion 9b to surround the nut 10.

Figure 3:
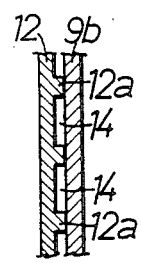
FIG. 3 is a cross-sectional detail taken along line III—III of FIG. 1.

A cylinder 11 is defined in the interior of the cylindrical portion 9c of the clutch outer 9 and extends in the axial direction of the cylindrical portion 9c of the clutch outer 9. An annular piston 12 is positioned within the cylinder 11 and is slidable within the cylinder 11 in an oil tight manner. The cylinder 11 and the annular piston 12 define an annular oil chamber 13 axially between the piston 12 and the disc portion 9b of the clutch outer 9. The piston 12 is shown to include a plurality of projections 12a as best seen in FIG. 3. These projections arranged on the periphery thereof extend axially to abutt against the inner surface of the disc portion 9b. The projections 12a limit the stroke of the piston toward the disc portion 9b and further provide an inlet having ports 14 between the projections 12a into the annular oil chamber 13.

A plurality of drive clutch plates 15 are coupled to the outer 9 by means of a spline coupling for axial movement within the inner peripheral surface of the cylindrical portion 9c adjacent to the front surface of the piston 12. A pressure receiving ring 17 is fixed on the inner peripheral surface of the cylindrical portion 9c of the outer 9 to oppose motion of the outermost clutch plate 15.

A clutch inner 18 coupled with the output gear 7 is concentrically disposed inside the cylindrical portion 9c of the clutch outer 9 and has a plurality of driven clutch plates 16 coupled to the outer periphery of the clutch inner by means of a spline coupling for sliding axial movement. The outer and inner clutch plates 15 and 16 are alternately arranged with two inner plates and three outer plates.

The outermost clutch plates 15 which are most adjacent the piston 12 and the pressure receiving ring 17 have protruding pieces 15a and 15b extending to a recess 19 defined in the inner peripheral surface of the cylindrical portion 9c. One protruding piece 15a has a support pin 20 secured thereto slidably passed through the other protruding piece 15b. A free spring 21 is mounted over the support pin 20 to bias the outermost opposite clutch plates 15 away from each other.

The clutch inner 18 includes a cylindrical portion 18a surrounding the boss 9a of the clutch outer. The cylindrical portion 18a and the boss 9a enclose a unidirectional clutch 22 interposed therebetween. The unidirectional clutch 22 transmits torque only upon a backload received by the clutch inner 18 from the output gear 7.

The cylindrical portion 9c of the clutch outer has an outlet from the oil chamber 13. The outlet includes a plurality of outlet bores 23 radially extending through the cylindrical portion 9c of the clutch outer 9. Each of a plurality of valve cylinders 24 extend axially perpendicular to an outlet bore 23. The outlet bores 23 open to the outer peripheral surface of the cylindrical portion 9c and the valve cylinders 24 open to the end surface of the cylindrical portion 9c on the opposite side of the cylindrical portion 9c from the annular piston 12. A spool valve 25 is slidably fitted within each of the valve cylinders 24. The spool valves 25 are moveable between a closed position in which the outer end of the valve 25 protrudes from the valve bore 24 with the outlet closed and an open position in which the spool valve 25 is retracted into the valve cylinder 24 to open the outlet bores 23. A valve spring 26 is contained in each valve bore 24 to bias the spool valve 25 into a position closing the outlet bores 23.

Figure 2:
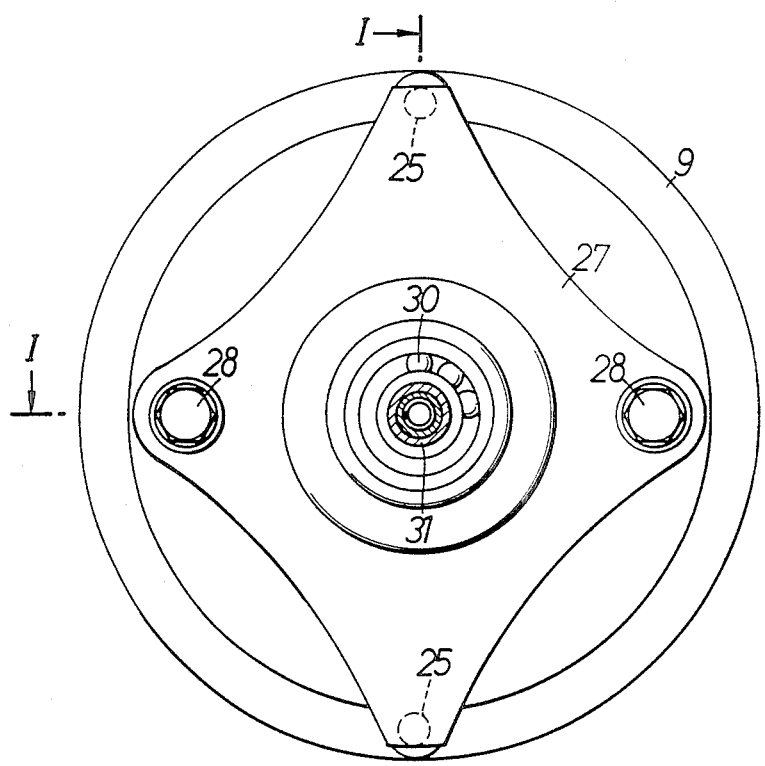
FIG. 2 is a cross-sectional view taken along line II—II of FIG. 1.

The plurality of spool valves 25 are arranged at regular spaced distances in the circumferential direction of the clutch outer 9. Two such spool valves are shown to be arranged at diametrical positions in FIG. 2. A common operating plate 27 is disposed to abutt against the outer ends of the spool valves to create a means for selectively controlling these valves. The operating plate 27 is slidably fitted on the cylindrical guide portion 9d. The operating plate 27 also slides over a plurality of short shafts 9e protruding from the outer surface of the disc portion 9d and rotating with the clutch outer 9. Bolts 28 are screwed into each of the short shafts 9e to support the outer surface of the operating plate 27. A return spring 29 is also mounted over each of the short shafts 9e to bias the operating plate 27 toward abuttment against the bolts 28. The retention of the operating plate 27 by the bolts 28 defines the closed position for the spool valves 25.

A release plate 31 is carried on the centrifugal portion of the operating plate 27 through release bearings 30. The release plate 31 is axially moveable by a cam mechanism 32 employed to open and close the spool valves 25. The cam mechanism 32 employs an adjusting bolt 33 supported in the side cover to coaxially align with the crankshaft 5. A stationary cam plate 34 having a boss 34a is threaded to the adjusting bolt 33. A moveable cam plate 35 is rotatably carried on the outer surface of the boss 34a; and a thrust ball 38 is inserted between respective opposed recesses 36 and 37 of both the cam plates 34 and 35. The stationary cam plate 34 is held against rotation by an actuator pin 39 secured in the cam plate 34 and engaged in a slide fit in a stop hole 40 in the inner surface of the side cover 2. The moveable cam plate 35 has a notch 42 cut in one side thereof to engage the end of an actuating lever 43 which is operated by a pedal shaft 44 rotatably carried in the side cover 2.

The adjusting bolt 33 extends through the side cover 2 and is tightly clamped to the side cover 2 by both a flange 33a integrally formed on the middle portion of the bolt 33 and a nut 45 threadedly connected to the outer end of the bolt 33. Thus, the nut 45 may be loosened to suitably turn the adjusting bolt 33 to provide adjustment of the axial position of the stationary cam plate 34. This results in adjustment of the opened and closed position of the spool valves 25. The side cover 2 has an oil feed passage 46 therein which is connected to the discharge port of an oil pump (not shown) for an associated engine. An oil passage 47 is provided to extend to the adjusting bolt 33 and the release plate 31 in a manner to connect the oil feed passage 46 to the cavity 9f in the cylindrical guide portion 9d. Additionally, a plurality of oil holes 48 extend through the disc portion 9b to permit the communication of the cavity 9f with the inside of the disc portion 9b. Further, an oil passage 49 extends in the crankshaft 5 to provide the communication between the cavity 9f and other portions of the drive train to be lubricated.

The oil passage 47 has one end opening to the cavity 9f inclined radially outward so as to permit oil fed therethrough to be distributed evenly toward oil holes 48 and into the opposite end opening of the oil passage 49, as illustrated in FIG. 1.

In operating the present embodiment, an associated engine is started. A backload may be applied on the clutch inner 18 through the output gear 7 as a starting means. The unidirectional clutch 22 would, under such circumstances, become locked to transmit the backload applied on the clutch inner 18 to the clutch outer 9 and thus to the crankshaft 5 for starting of the engine. The application of the backload on the crankshaft 5 through the output gear 7 in this manner is also useful in providing engine braking during deceleration of a vehicle employing the present embodiment.

With the engine started, lubricating oil is pumped from an oil pump (not shown) into the oil feed passage 46 and passed through the oil passage 47 to fill the cavity 9f in the cylindrical guide portion 9d. The lubricating oil then flows through the oil holes 48 into the interior of the clutch outer 9 and also through the oil passage 49 to the engine portion to be lubricated.

Part of the oil supplied into the interior of the clutch outer 9 enters the annular oil chamber 13 through the inlet 14 while the remainder of the oil is provided for the cooling of the clutch plates 15 and 16. The oil having entered the annular oil chamber 13 is then subjected to the action of centrifugal force with the rotation of the clutch outer 9 driven by the crankshaft 5. This develops an oil pressure in the oil chamber 13. The oil chamber causes the piston 12 to be urged toward the clutch plates 15 and 16. With the engine in an idling state, however, the urging force by the oil pressure on the piston 12 is designed to be smaller than the set load applied to the springs 21. Under idling conditions, therefore, the piston 12 will not be moved toward the clutch plates and the clutch 6 remains disengaged. Upon increasing the speed of the crankshaft 5 to actuate the clutch, the force on the piston 12 by the oil pressure is increased to overcome the set load on the free springs 21. The piston 12 then starts to actuate the clutch by compressing the free springs 21 to clamp the clutch plates 15 and 16 against the cooperating pressure receiving ring 17. With increasing engaging force on the clutch plates 15 and 16, the centrifugal clutch 6 is brought into an engaged state. A semi-engaged state may be realized as well to avoid jerking of the drive train. Consequently, the output torque from the crankshaft 5 is transmitted through the clutch outer 9, the arrangement of clutch plates 15 and 16, the clutch inner 18 and the output gear 7 to the reduction gear 8 for for driving the wheels of a vehicle.

To disengage the centrifugal clutch 6 when in the engaged state, the actuating lever 43 may be rotated through the pedal shaft 44 to turn the moveable cam plate 35 through a predetermined angle. This causes the thrust ball 38 to push the moveable cam plate 35 away from the stationary cam plate 34 while it is climbing on the inclined surfaces of the respective recesses 36 and 37 in both the cam plates 34 and 35 under relative rotation between the cam plates 34 and 35. The moveable cam plate 35 allows the valves 25 to be shifted to open the outlets against the resistance of the return spring 29 through operation of the operating plate 27. As a result, the outlet bores 23 from the annular oil chamber 13 are opened. This permits the oil in the oil chamber 13 to flow out of the chamber 13 through the outlet bores 23 into the clutch chamber 3. Thus, pressure under the influence of centrifugal force is reduced within the oil chamber 13. A reduction in oil pressure within the annular oil chamber 13 causes the outermost opposite drive clutch plates 15 to be spread away from each other by the resilient force of the free springs 21. This in turn returns the piston 12 to the initial unloaded position. In this manner, all clutch plates 15 and 16 are released from engagement and the transmission of torque is interrupted from the clutch outer 9 to the clutch inner 18.

By working the pedal shaft 44, the outlet bores 23 may be controlled to such an extent that they may be partially opened by the spool valves 25. In such a state, partial engagement of the clutch may be employed as needed.

Upon release of the actuating lever 43, the operating plate 27 will return by the bias force of the return springs 29. The spool valves 25 are returned to the closed position by the resilient force of the valve springs 26 to close the outlet bores 23 so that additional oil entering the inlet 14 is accumulated in the annular oil chamber 13 to recover the oil pressure in the chamber. The centrifugal clutch 6 is thus brought into an engaged state again. The speed of such engagement can be controlled by the adjustment of the flow rate of the oil into the annular oil chamber 13 through the selection of the inlet ports 14 to reduce shock caused by engagement of the clutch during high speed rotation.

Thus, an oil pressure actuated centrifugal clutch eliminating centrifugal rollers and other weights is disclosed. The actuation of the clutch finds fixed resistance from the springs 26 that does not depend on clutch speed. Accordingly, a smooth running, easily actuated and quiet centrifugal clutch is disclosed.

What is claimed is:

1. A centrifugal clutch comprising a clutch inner; a clutch outer;
  a arrangement of clutch inner and clutch outer plates, said clutch inner plates being coupled with said clutch inner and said clutch outer plates being coupled with said clutch outer, said clutch inner and clutch outer plates being alternately arranged;
  a pressure receiving plate axially fixed in the clutch and adjacent one end of said arrangement of plates;
  an annular piston axially adjacent the other end of said arrangement of plates and axially moveable to compress said arrangement of plates;
  a cylinder about said piston defining an annular cavity axially between said cylinder and said piston;
  an oil inlet to said cavity at the inner periphery thereof;
  an oil outlet from said cavity at the outer periphery thereof, said cavity expandible and contractable by oil flowing into and out of said cavity, respectively, through said oil inlet for axially moving said piston;
  a spool type valve disposed within said oil outlet and slidable in a bore oriented parallel to the axis of rotation of said clutch between an open position and a closed position said valve biased into a closed position thereby closing said oil outlet; and
  mechanically operated means for selectively controlling said valve including an operating plate rotatable together with said clutch outer about the axis of rotation of said clutch, said operating plate abutting said spool valve, and cam means for reversably axially biasing said operating plate against said spool valve, said valve thereby displaceable to said open position to release oil pressure generated within said cavity.

2. The centrifugal clutch of claim 1 wherein said inlet is restricted to control the rate of flow therethrough.

3. The centrifugal clutch of claim 1 wherein said valve includes a spool valve body and a valve cylinder, said spool valve sliding axially in said valve cylinder, said oil outlet traversing said valve cylinder, said valve control means controlling axial placement of said spool valve.

4. The centrifugal clutch of claim 1 wherein said oil outlet includes a plurality of outlet ports.

5. A centrifugal clutch having an input and an output, comprising
  a clutch inner coupled with the output;
  a clutch outer coupled with the input;
  an arrangement of clutch inner and clutch outer plates, said clutch inner plates being coupled with said clutch inner and said clutch outer plates being coupled with said clutch outer, said clutch inner and clutch outer plates being alternately arranged;
  a pressure receiving plate axially fixed in said clutch outer adjacent one end of said arrangement of plates;
  an annular piston axially adjacent the other end of said arrangement of plates and axially moveable to compress said arrangement of plates;
  a cylinder about said piston defining an annular cavity axially between said cylinder and said piston;
  an oil inlet to said cavity at the inner periphery of said cavity;
  an oil intlet from said cavity at the outer periphery of said cavity, said cavity expandable and contractible by oil flowing into and out of said cavity, respectively, through said oil inlet for axially moving said piston;
  a spool type valve disposed within said oil outlet and slidable in a bore oriented parallel to the axis of rotation of said clutch between an open position and a closed position said valve biased into a closed position thereby closing said oil outlet; and
  mechanically operated means for selectively controlling said valve to open and close said outlet including an operating plate rotatable together with said clutch outer about the axis of rotation of said clutch, said operating plate abutting said spool valve, and cam means for reversably axially biasing said operating plate against said spool valve, said valve thereby displaceable to said open position to release oil pressure generated within said cavity.

* * * * *

UNITED STATES PATENT AND TRADEMARK OFFICE
CERTIFICATE OF CORRECTION

PATENT NO.  : 4,708,231
DATED       : November 24, 1987
INVENTOR(S) : Takanori Onda et al.

It is certified that error appears in the above-identified patent and that said Letters Patent are hereby corrected as shown below:

In claim 1, line 3, delete "a" and insert therefor -- an --.

In claim 5, line 20, delete "intlet" and insert therefor -- outlet --.

Signed and Sealed this

Nineteenth Day of April, 1988

Attest:

DONALD J. QUIGG

*Attesting Officer*  *Commissioner of Patents and Trademarks*